(12) United States Patent
Oostdijk et al.

(10) Patent No.: US 11,536,647 B2
(45) Date of Patent: Dec. 27, 2022

(54) SYSTEM AND METHOD FOR MEASURING THE COEFFICIENT OF FRICTION ON A CONVEYOR BELT

(71) Applicant: SYSTEM PLAST S.R.L., Telgate (IT)

(72) Inventors: Piet Oostdijk, Klaaswaal (NL);
Giorgio Varisco, Castelli Calepio (IT);
Francesco Giuseppe Zani, Adro (IT)

(73) Assignee: SYSTEM PLAST S.R.L., Telgate (IT)

(*) Notice: Subject to any disclaimer, the term of this patent is extended or adjusted under 35 U.S.C. 154(b) by 536 days.

(21) Appl. No.: 16/683,000

(22) Filed: Nov. 13, 2019

(65) Prior Publication Data
US 2020/0150027 A1 May 14, 2020

(30) Foreign Application Priority Data
Nov. 13, 2018 (IT) .................. 102018000010292

(51) Int. Cl.
*G01N 19/02* (2006.01)
*B65G 43/00* (2006.01)

(52) U.S. Cl.
CPC ............ *G01N 19/02* (2013.01); *B65G 43/00* (2013.01); *B65G 2203/0275* (2013.01); *B65G 2203/042* (2013.01)

(58) Field of Classification Search
CPC ............... G01N 19/02; B65G 43/00; B65G 2203/0275; B65G 2203/042
USPC .............................................................. 73/9
See application file for complete search history.

(56) References Cited

U.S. PATENT DOCUMENTS 4,722,218 A 2/1988 Strader
2016/0176648 A1* 6/2016 Van Den Berg ....... B65G 45/02
198/340

FOREIGN PATENT DOCUMENTS

| DE | 102011084451 A1 * | 4/2013 | ............. B65G 21/10 |
| DE | 102014105894 A1 * | 10/2015 | ............. B65G 43/04 |
| EP | 3030506 B1 | 9/2018 | |
| JP | 2018105842 A | 7/2018 | |
| WO | WO-2020173864 A1 * | 9/2020 | ............. B65G 43/02 |

OTHER PUBLICATIONS

Italian Search Report and Written Opinion for IT Patent Application No. 102018000010292, dated Jul. 17, 2019, 7 pages. (No English Translation available).

* cited by examiner

*Primary Examiner* — Gene O Crawford
*Assistant Examiner* — Lester Rushin, III
(74) *Attorney, Agent, or Firm* — Armstrong Teasdale LLP

(57) ABSTRACT

A measurement system and a method for measuring a coefficient of friction on a slidable conveyor belt in a direction of movement are provided. The system includes a disk floatingly placed on the conveyor belt and having a bottom surface, wherefrom projects at least one rounded element that rests on the conveyor belt, having a shape that, regardless of the relative orientation of the disk and the conveyor belt, at least one rounded element extends along a direction not parallel to the direction of movement, a pair of abutment elements maintaining the disk fixed with respect to the direction of movement of the conveyor belt, and a pair of load cells operatively associated with the abutment elements and with the disk, to measure a thrust force exerted by the disk on each load cell by effect of the relative sliding of the conveyor belt with respect to the disk.

15 Claims, 6 Drawing Sheets

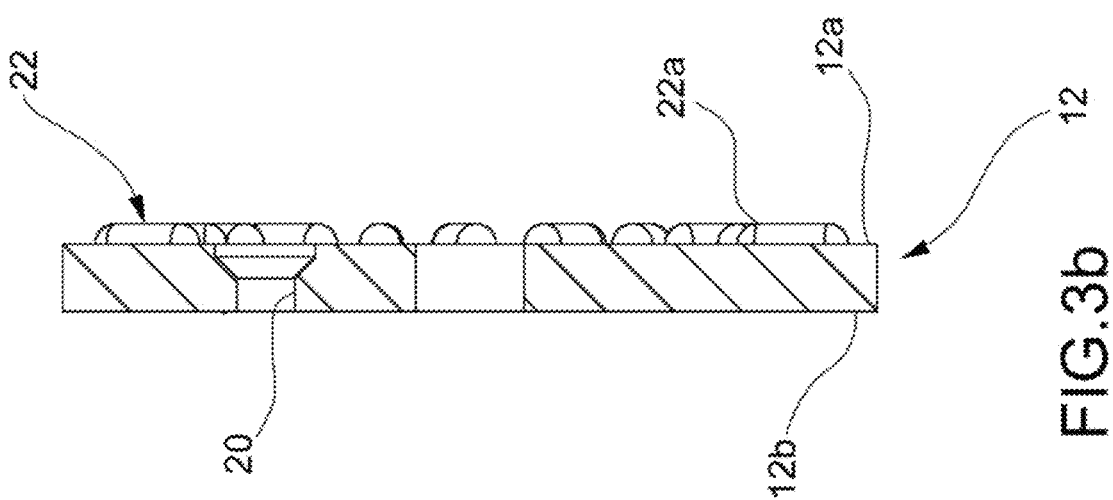
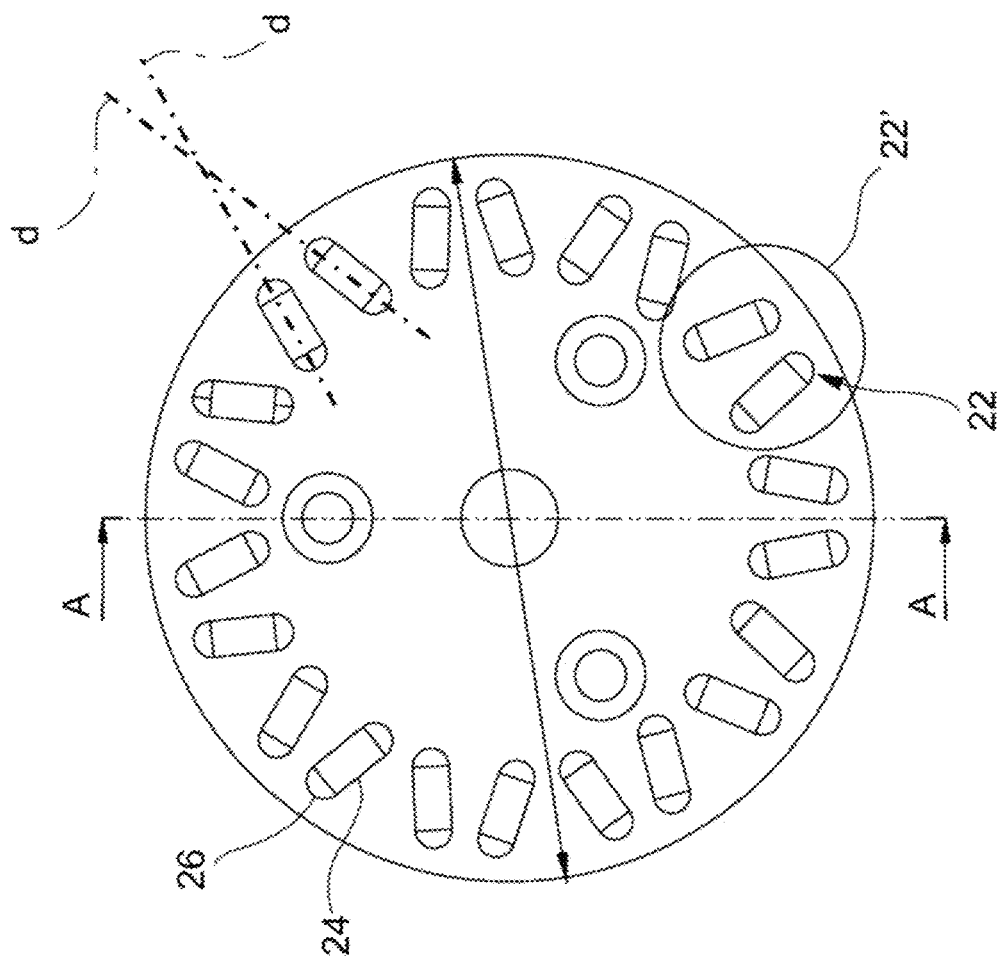
FIG.3b
FIG.3a

SYSTEM AND METHOD FOR MEASURING THE COEFFICIENT OF FRICTION ON A CONVEYOR BELT

CROSS-REFERENCE TO RELATED APPLICATION

This application claims the benefit of priority to Italian Patent Application No. 102018000010292 filed Nov. 13, 2018, the entire contents of which are incorporated by reference herein.

FIELD OF THE INVENTION

The present invention relates in general to a measurement system and method for measuring the coefficient of friction on a slidable conveyor belt. In particular, the present invention relates to a measurement system and method for measuring the coefficient of sliding friction on a slidable conveyor belt, for example part of a plant for bottling liquids in bottles or containers for liquids.

The invention will, hereafter, be described within a plant for bottling liquids in bottles or containers for liquids, because it represents a particularly suitable application thereof, but it is also applicable to any industrial plant in which containers (for example for liquids, for food products, or for other uses) or products (for example bottles, cans, or others) are transported on a slidable conveyor belt, and in which it is necessary to maintain a determined condition of friction between the containers or the products and the slidable conveyor belt. By way of non-limiting example, the invention is also applicable to bottle washing plants, to plants for canning food products or to plants for labelling products, for example of canned products, and references to bottling plants or to containers for liquids should not be considered as limiting the scope of the invention.

BACKGROUND OF THE INVENTION

A bottling plant generally comprises a series of workstations in which several machines are located, and a slidable conveyor belt on which the bottles or, more in general, the containers for liquids (for example, cans), are placed in vertical position, and through which they are carried to the different workstations. The conveyor belt, or mat, generally consists of a plurality of plates hinged, or otherwise attached, to each other and that have superiorly a resting surface, generally made of plastic or of steel. Along the route, the containers for liquids pass through different workstations, i.e. they are fed to different machines of the plant, to carry out the operations, for example, of washing, rinsing, bottling, plugging or seaming. Along this route, the containers for liquids undergo several accelerations or decelerations according to the needs of the machine to which they are passed. The "flow rate', i.e. the inflow of containers for liquid in a unit of time, is constant throughout the plant, but in the areas of lower velocity there is a relative sliding between the mat, or conveyor belt, and the containers for liquids. Hence, there is a friction between the bottom of the containers for liquids and the conveyor belt. When the friction rises above a certain limit, in the areas of acceleration or accumulation, the containers for liquids start to fall. Naturally, the tribological properties of the conveyor belt and of its resting surface are fundamental to maintain the containers for liquids in a vertical position while they are transported from a workstation to the other, and in particular during the phases of acceleration or deceleration of the conveyor belt. For this reason, it is fundamental to keep the coefficient of sliding friction between the containers for liquids and the resting surface of the conveyor belt constantly under control. However, the coefficient of friction has to be kept under control and hence it needs to be measured frequently, because it is variable during the operations of the plant according to a number of parameters, such as use and, thus, the wear of the resting surface, the conditions of humidity, of lubrication or of wet surface due, for example, to the accidental spillage of liquid, and the state of cleanliness of the resting surfaces of the conveyor belt.

Generally, to carry out the measurement of the coefficient of friction, a container or a product among the conveyed ones, for example a bottle, is maintained in erect position, blocked by means of a locking device, on the conveyor belt, while the latter slides, and a reaction force that said container or product exerts on the locking device is measured. The coefficient of friction can be determined from the measurement of this reaction force. However, this type of measurement is affected by drawbacks. A same container or product maintained locked on the conveyor belt wears easily and rapidly, and it does not constitute a sufficiently reliable measurement sample that can be reused over time. Moreover, the measurement has to be recalibrated every time the type of containers or products used is changed.

A device for measuring the coefficient of friction is known, for example, from the patent publication EP 3 030 506 B1.

SUMMARY OF THE INVENTION

It is an object of the present invention to obtain a measurement of the coefficient of friction between the resting surface of the conveyor belt and the transported containers or products that is reliable, and that maintains the reliability and the precision of the measurement of the coefficient of friction over time.

This and other purposes are fully achieved according to the present invention by a measurement system and method as described and claimed herein.

Advantageous embodiments of the invention are also described.

In short, the invention is based on the idea of providing a system for measuring the coefficient of friction on a slidable conveyor belt in a direction of movement, comprising a disk, which is placed floating on the conveyor belt, and which has a bottom surface wherefrom projects at least one rounded element, such that, regardless of the relative orientation of the disk with respect to the conveyor belt, at least one rounded element extends along a direction that is not parallel to the direction of movement of the conveyor belt; a pair of abutment elements to maintain the disk fixed with respect to the direction of movement of the conveyor belt; and a pair of load cells operatively associated with the abutment elements and with the disk, adapted to measure a thrust force exerted by the disk on each load cell by effect of the relative sliding of the conveyor belt with respect to the disk.

Preferably, said disk is made of stainless steel, more preferably of chromed stainless steel, and still more preferably of tempered and chromed stainless steel, and has a surface hardness greater than or equal to 45 in the Rockwell-HRC hardness scale.

By virtue of such a measurement system, it is possible to carry out a measurement of the coefficient of friction that is reliable and that maintains such reliability over time. In particular, by virtue of the particular configuration of the metal disk, the measurement of the coefficient of friction is not negatively influenced by the conditions of wear of the disk.

Moreover, by virtue of the rounded shape of the elements projecting from the bottom surface of the disk, it is possible to measure the coefficient of friction reliably even in humid conditions, without any aquaplaning.

BRIEF DESCRIPTION OF THE DRAWINGS

Further features and advantages of the present invention will become apparent from the following description, provided purely by way of non-limiting examples with reference to the drawings.

FIGS. 3a, 3b and 3c are, respectively, a bottom view, a lateral section view according to the plane of section A-A of FIG. 3a, and an isometric bottom view of a disk of the measurement system, according to a first embodiment;

DETAILED DESCRIPTION OF THE INVENTION

Figure 1:
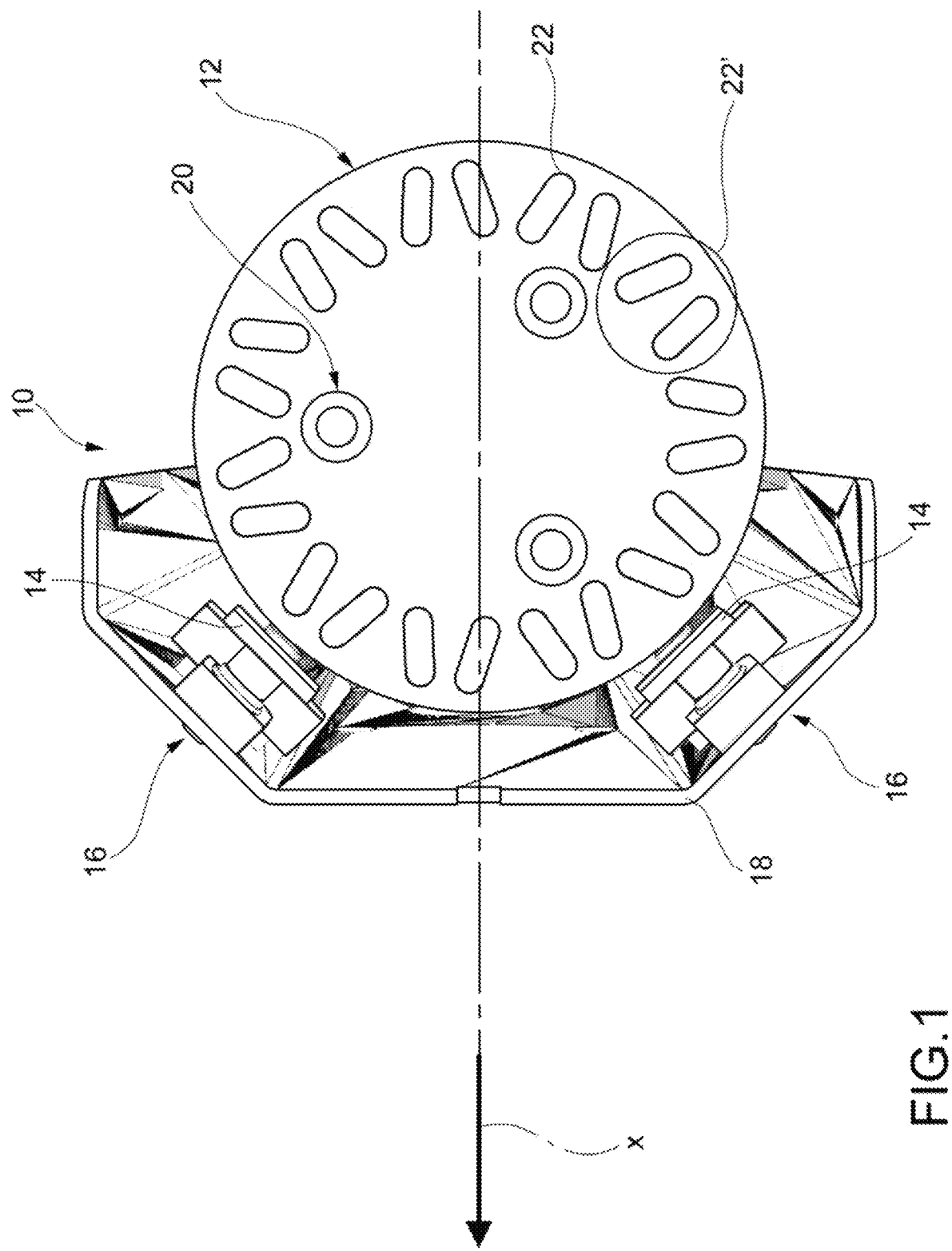
FIG. 1 is a bottom view of a measurement system according to the invention.

With reference initially to FIGS. 1-3c, a measurement system for measuring the coefficient of friction on a conveyor belt N, slidable in a direction of movement x, is generally indicated by the numeral 10.

The measurement system 10 basically comprises a disk 12 made of metallic material, a pair of load cells 16 and an abutment element 14 associated with each load cell 16.

The abutment elements 14 are adapted to keep the disk 12 fixed relative to the direction of movement x of the conveyor belt N, and are mounted associated with the load cells 16.

Figure 2:
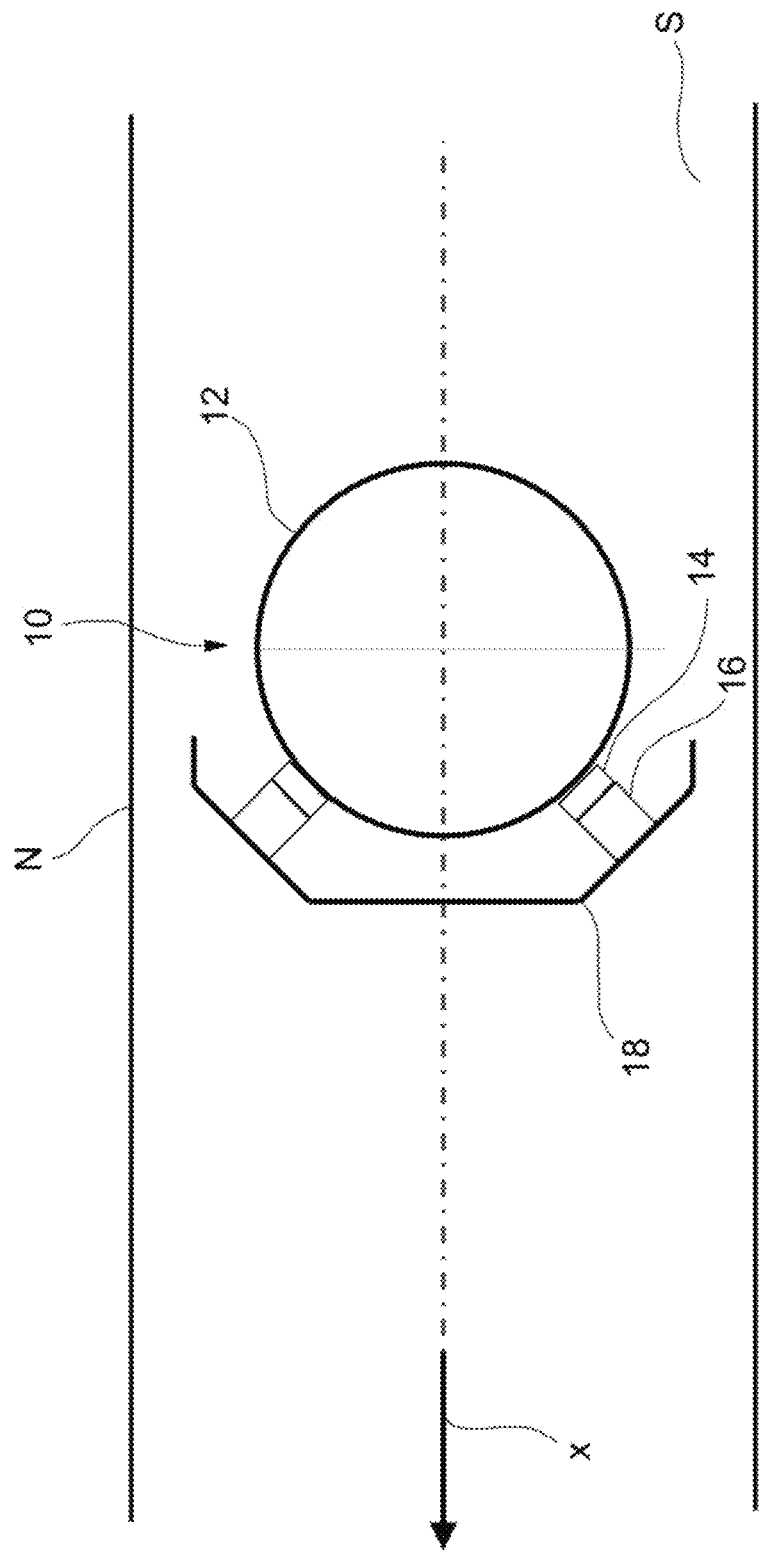
FIG. 2 is a schematic top view of a measurement system according to the invention.

The load cells 16 are arranged to measure a thrust force exerted by the disk 12 on each load cell 16. As shown in FIGS. 1 and 2, each load cell 16 is associated with a respective abutment element 14 and with the disk 12. Preferably, each load cell 16 is positioned along a half-line originating from the centre of the disk 12 and inclined by approximately 45 degrees with respect to the direction of movement x of the conveyor belt N, toward the direction of movement x, as shown in FIGS. 1 and 2. The load cells 16 are, for example, mounted on a metal panel 18. Alternatively, the load cells 16 can be supported by any stable support system, which does not interfere with the sliding of the conveyor belt N, and which has such flexo-torsional rigidity as not to compromise the quality of the measurement. The load cells 16 are positioned on a plane parallel to a resting surface S of the conveyor belt N, and consequently they measure a thrust force, exerted by the disk 12 on each load cell 16, lying on this plane. The load cells 16 can also be connected to an electronic processing unit (not shown, known per se) arranged to receive, process and/or store a signal generated by each load cell 16, to determine a coefficient of friction of the disk 12 on the conveyor belt N. The electronic processing unit can be contained in a protective box (not shown, known per se), for example a box according to the IP67 standard.

The disk 12 is placed, floating, on the horizontal plane of the resting surface S of the conveyor belt N, and kept substantially fixed relative to the direction of movement x of the conveyor belt N by means of the abutment elements 14. However, the disk is not blocked, and it is free, by effect of the sliding of the conveyor belt N along the direction of movement x, to oscillate along a direction substantially perpendicular to the direction of movement x of the conveyor belt N, and/or to rotate in the horizontal resting plane. The disk can, for example, be lowered, on command, on the conveyor belt N by means of a piston (not shown, known per se) to which is connected, for example, by means of classic mechanical connection elements, such as screws and/or bolts, provided in through holes 20, equally spaced angularly, and radially equidistant from the centre of the disk 12 and provided thereon. Between the control piston and the disk 12, by means of the through holes 20, there may also be connected a mass of predetermined value, for example a mass equivalent to that of the product or of the container, for example of the container for liquids, whose behaviour is to be simulated. For example, it is possible to connect the disk 12 by means of screws and/or bolts inserted in the through holes 20 to a mass of approximately 0.5 kg. Alternatively, the disk 12 can be connected to a mass of predetermined value by means of any mechanical connection system; for example, the disk 12 can be connected to a mass of predetermined value, or directly to a control piston, through a bayonet coupling or a snap-fit coupling.

The disk 12 is preferably made of stainless steel, more preferably of tempered stainless steel, and still more preferably of tempered and chromed stainless steel, and preferably it has a surface hardness greater than or equal to 45 in the Rockwell-HRC hardness scale. Still more preferably, the disk 12 has a surface hardness greater than or equal to 54 in the Rockwell-HRC hardness scale.

The disk 12 may have a diameter that is basically the same as that of the product or of the container, for example of the container for liquids, whose behaviour is to be simulated; for example, the disk 12 may preferably have a diameter of between approximately 50 mm and approximately 80 mm.

The disk 12 has a bottom surface 12a, i.e. oriented towards the conveyor belt N when the disk 12 is placed on the resting surface S of the conveyor belt N, and an upper surface 12b, opposite to the bottom surface 12a. At least one element 22 protrudes below the bottom surface 12a, i.e. in the direction of the conveyor belt N, the at least one element 22 having a rounded shape, and thus defining a contact surface 22a that rests on the conveyor belt N.

The configuration and the shape of the at least one rounded element 22 is such that there is no relative orientation of the disk 12 with respect to the direction of movement of the conveyor belt x that minimizes the friction force. In particular, the shape of the at least one rounded element 22 is such that, regardless of the relative orientation of the disk 12 with respect to the slidable conveyor belt N, at least one rounded element 22 extends along a direction of extension d not parallel to the direction of movement x of the conveyor belt N. The direction of extension d of the at least one rounded element 22 lies on a plane parallel to a median plane of the disk 12, i.e. on a plane parallel to the plane of the resting surface S of the conveyor belt N. Since it is variable according to the shapes which the rounded element 22 may assume in different embodiments of the invention, the direction of extension d may be intended as a preferential direction of extension, for example the direction along which the maximum development in terms of size of the rounded element 22 lies. When the at least one rounded element 22 has elongated shape, the direction of extension d then corresponds with the direction along which said elongation develops (see the embodiment illustrated in FIGS. 3a through 3c). When the at least one rounded element 22 has annular shape, the direction of extension d corresponds to any of the straight line tangential to the median circumference of the annular shape (see the embodiment illustrated in FIG. 5).

Figure 3C:
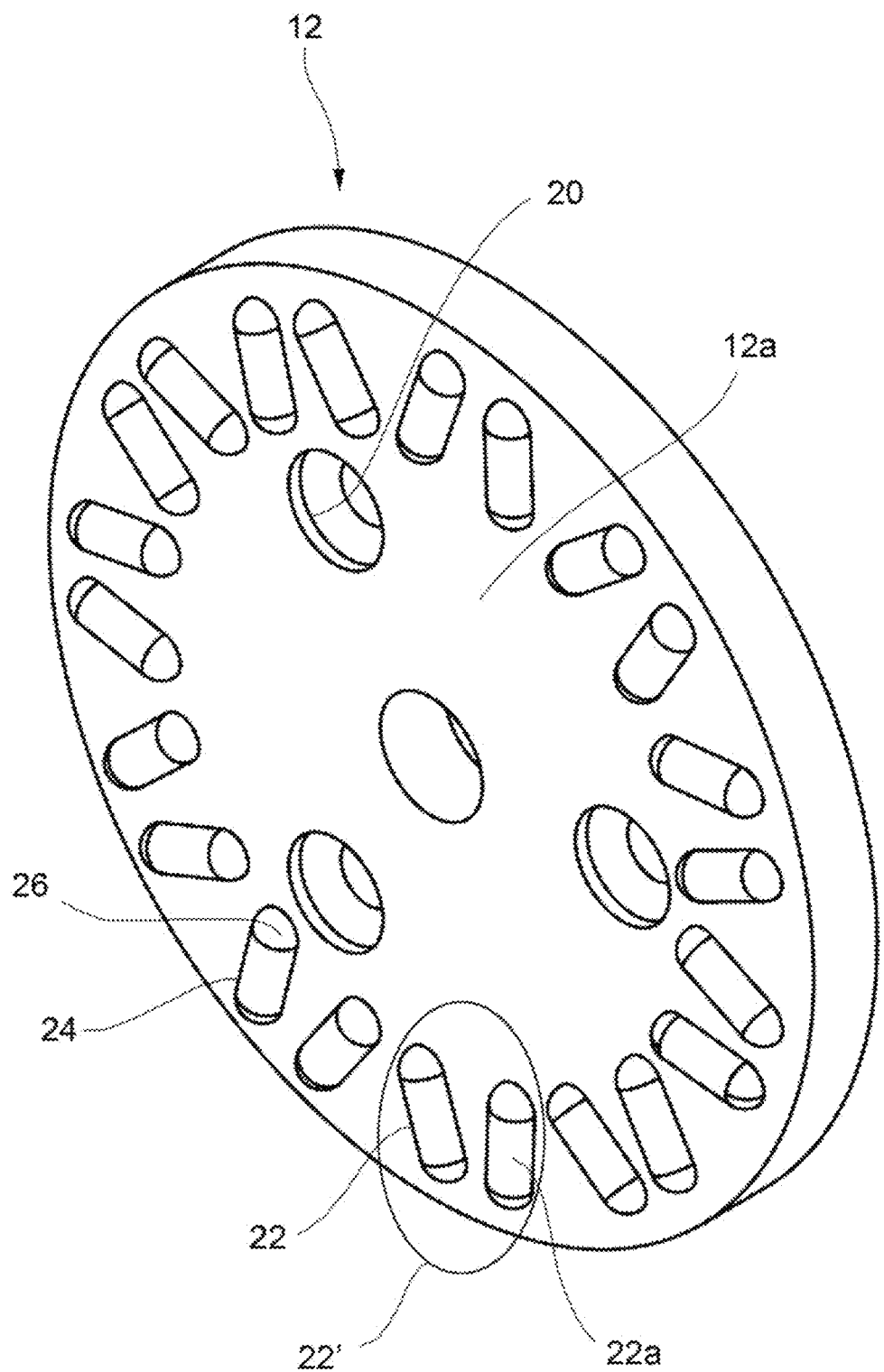
Figure 4:
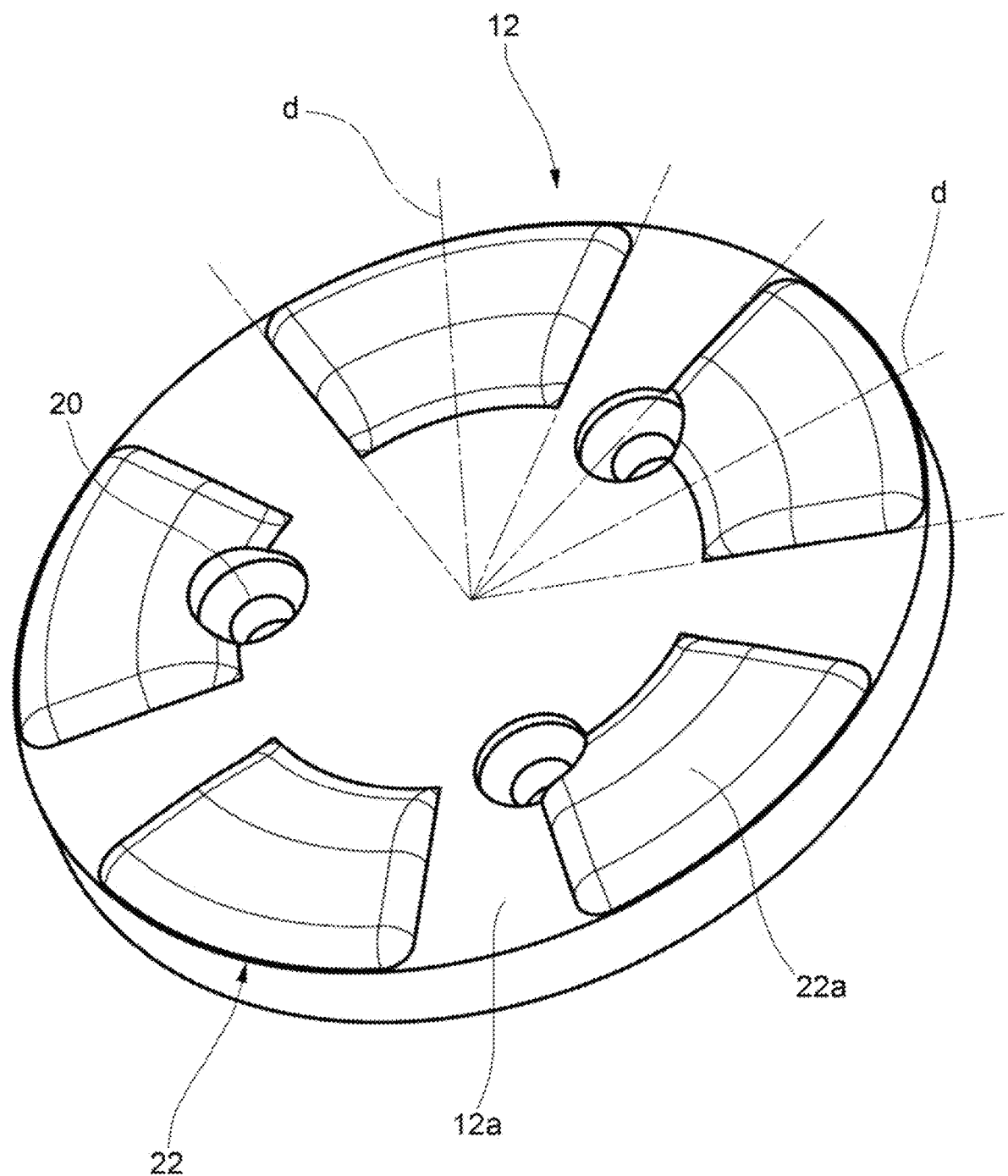
FIG. 4 is an isometric bottom view of a disk of the measurement system, according to a second embodiment.
Figure 5:
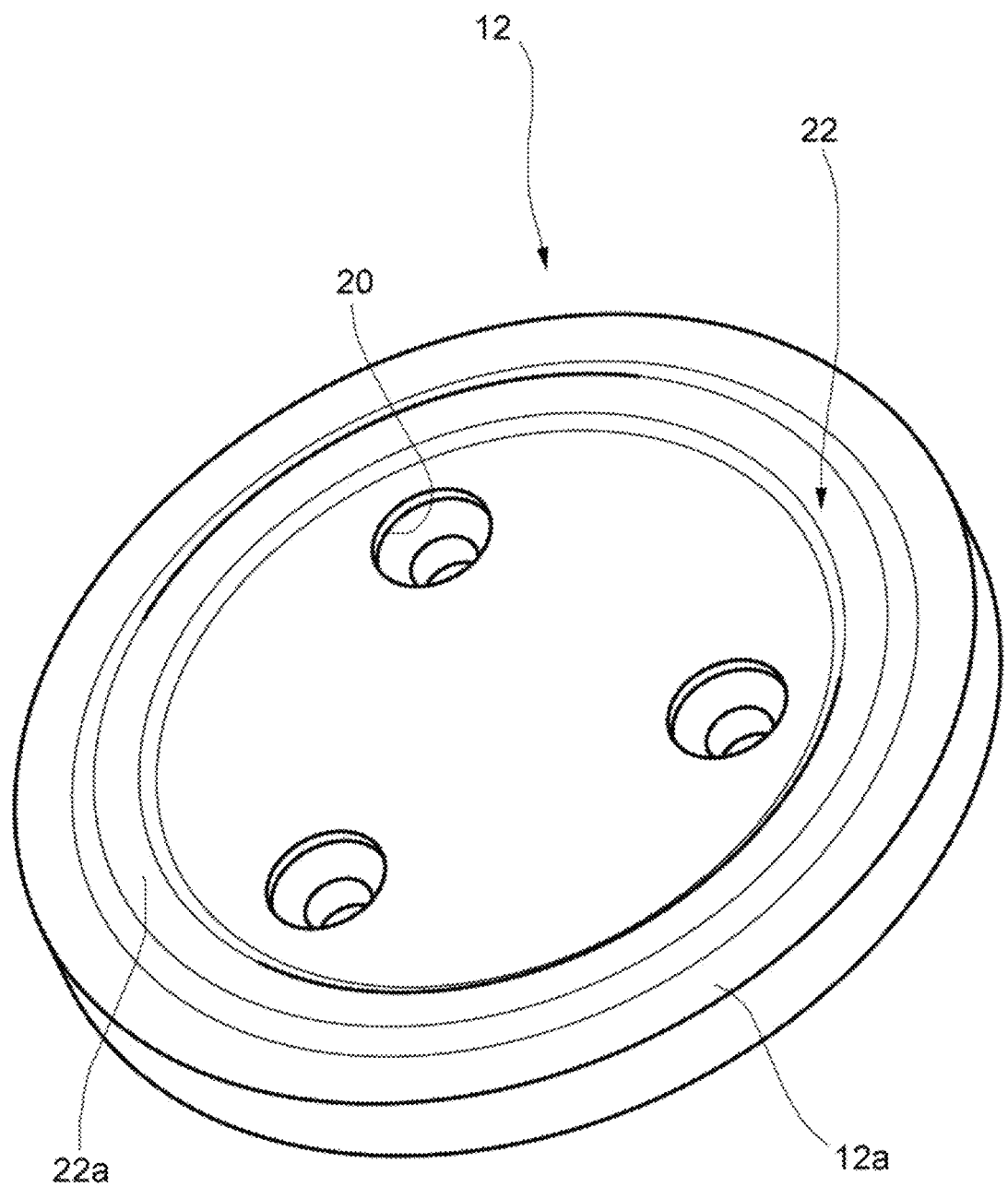
FIG. 5 is an isometric bottom view of a disk of the measurement system, according to a third embodiment.

Various shapes may be assumed by the at least one rounded element 22, and those shown in three different embodiments in FIGS. 3c, 4 and 5 should be understood as being purely by way of non-limiting example. It is possible to determine and choose the shape and the configuration of the at least one rounded element 22 of the disk 12 of the measurement system 10 according to the specific application, i.e. of the type of product or of container, for example of the type of container for liquids, whose tribological behaviour is to be simulated. In particular, the configuration of the at least one rounded element 22 is such as to obtain pressures and contact angles or radii similar to those of the product or of the container, for example of the container for liquids, whose coefficient of friction with the conveyor belt N is to be determined. The contact surface 22a, in particular, can be subjected to specific finishing and surface treatments, able to improve its ability to simulate the behaviour of the contact surface between the product or the container and the conveyor belt N. The different embodiments of the at least one rounded element 22 described herein were examined with experimental tests, which demonstrated the possibility of obtaining accurate, reliable results over time. In particular, the experimental tests demonstrated that the tribological behaviour of the disk 12 is equivalent to that of the product or of the container whose coefficient of friction with the conveyor belt N is to be measured, regardless of the conditions of wear, of cleanliness, of lubrication or of humidity of the contact surface 22a with the conveyor belt N, and regardless of the sliding speed of the conveyor belt N along the direction of movement x.

In FIGS. 1-3c, the disk 12 according to a first embodiment according to the invention is shown. The disk 12 according to this embodiment is particularly adapted to simulate the tribological behaviour of a glass bottle placed on the slidable conveyor belt N and, thus, to determine with precision the coefficient of sliding friction of a glass bottle placed on the resting surface S of the conveyor belt N. According to this embodiment, an odd number of pairs of rounded elements 22' projects from the bottom surface 12a of the disk 12. Said pairs 22' are distributed along the periphery of the bottom surface 12a, i.e. along a radially outer area of the bottom surface 12a. The rounded elements 22 extend in a non-radial direction of extension d. In particular, said rounded elements 22 comprise a substantially rectilinear central portion, and two rounded ends 26. In particular, in a preferable configuration, in each pair of rounded elements 22', the rounded elements 22 extend in directions d that converge in a radially outer direction. The relative orientation of the two rounded elements 22 comprising a same pair of rounded elements 22' may be varied in different embodiments of the disk 12. It is possible to vary the number of pairs of rounded element 22', as well as any of, or all of, the dimensions of the rounded elements 22, or also the distance and the distribution of the rounded elements 22. In this case, too, the elements 22 are rounded, and the elements and the bottom surface 12a of the disk 12 are joined by a connecting radius. Advantageously, the rounded elements 22 are distanced from each other by at least 2 mm.

In FIG. 4, the disk according to a second embodiment according to the invention is shown. The disk 12 according to this embodiment is particularly adapted to simulate the tribological behaviour of a plastic bottle, for example made of PET, placed on the slidable conveyor belt N and, thus, to determine with precision the coefficient of sliding friction of a plastic bottle placed on the resting surface S of the conveyor belt N. According to this embodiment, a plurality of elements 22, shaped as lobes, projects from the bottom surface 12a of the disk 12. The rounded elements 22 are equal to each other, positioned at the same distance from the centre of the disk 12, and angularly distanced in a uniform manner. As shown in FIG. 4, therefore, the plan shape of the contact surface 22a that bears on the conveyor belt N of each lobe shaped element 22 substantially corresponds to that of an annular sector, i.e. of a portion of annulus or ring (or of a set of points of the plane, comprised between two concentric circles) enclosed between two delimiting radii, and the direction of extension d of each lobe-shaped element 22 is identified, in this case, with a radial direction positioned equidistant from the two delimiting radii.

In FIG. 5, the disk according to a third embodiment according to the invention is shown. The disk 12 according to this embodiment is particularly adapted to simulate the tribological behaviour of an aluminium can placed on the slidable conveyor belt N and, thus, to determine with precision the coefficient of sliding friction of an aluminium can placed on the resting surface S of the conveyor belt N. According to this embodiment, from the bottom surface 12a of the disk 12 an annular element 22 protrudes, positioned concentrically to the disk 12, in proximity to a radially outer area of the bottom surface 12a. In this case, too, the elements 22 are rounded, and the elements and the bottom surface 12a of the disk 12 are joined by a connecting radius.

An additional aspect of the invention relates to a measurement method for measuring the coefficient of friction on a conveyor belt N. In particular, the method according to the invention comprises the steps of:

a) placing the disk 12 of the measurement system 10 and keeping the disk in a fixed position, with respect to the direction of movement x of the conveyor belt N; and b) generating, through the load cells 16 operatively associated with the respective abutment elements 14 and with the disk 12, a measurement signal representative of a thrust force exerted by the disk 12 on each load cell 16, due to the relative sliding of the conveyor belt N with respect to the disk 12.

In particular, it is possible to select the most suitable disk 12, using the disk 12 from whose bottom surface 12a protrudes the most suitable at least one rounded element 22 according to the type of product or container whose tribological behaviour is to be simulated, for example using the disk 12 according to the first, the second or the third embodiments described previously to determine the coefficient of friction of, respectively, a glass bottle, a plastic bottle, or an aluminium can.

Advantageously, the method according to the invention further comprises the step of transmitting the measurement signal generated by each load cell 16 to an electronic processing unit, and to use the latter to process, or to store, said measurement signal, so as to determine the coefficient of friction of the disk 12 on the slidable conveyor belt N. The measurement signal elaboration process may comprise the use of a corrective coefficient to correlate the measurement carried out to an actual coefficient of friction, for example of a corrective coefficient that depends on the embodiment of the disk 12, and on the conditions of humidity and of cleanliness of the resting surface S of the slidable conveyor belt N.

As is readily apparent from the above description, by virtue of a measurement system and method according to the invention it is possible to obtain a measurement of the coefficient of friction between the conveyor belt and the product or container that is precise and reliable, and that maintains its reliability over time.

In particular, by virtue of the conformation of the at least one rounded element protruding from the bottom surface of the disk, it is possible to simulate the tribological behaviour of the product or container whose coefficient of friction is to be measured precisely and reliably. Moreover, by virtue of the rounded shape of the at least one projecting element, the measurement is not affected by humidity or by the presence of any liquid spilled on the conveyor belt.

Moreover, by virtue of the presence of through connecting holes, or of a mechanical or bayonet or snap-fit coupling, it is possible to connect to the disk, from time to time, bodies of known mass, so as to adapt the same disk to the measurement of the coefficient of friction for products or containers having different masses, but equal contact surfaces with the conveyor belt.

Lastly, by virtue of the fact that the disk is placed floating, and free to rotate on itself or to oscillate in a substantially perpendicular direction with respect to the direction of movement of the conveyor belt, the disk is able to reproduce the actual movement of the product or of the container whose tribological behaviour is to be simulated and hence whose coefficient of friction with the conveyor belt is to be determined.

The principle of the invention remaining unchanged, embodiments and construction details may be modified with respect to what has been described by way of non-limiting examples, without thereby departing from the scope of protection as described and claimed herein.

What is claimed is:

1. A measurement system for measuring a coefficient of friction on a conveyor belt, slidable in a direction of movement, the measurement system comprising:
   a metallic disk floatingly placed on said conveyor belt, said metallic disk having a bottom surface, at least one rounded element having a contact surface that rests on said conveyor belt, protruding below the bottom surface, the shape of said at least one rounded element being such that, regardless of the relative orientation of the metallic disk with respect to the conveyor belt, at least one rounded element extends along a direction of extension that is not parallel to the direction of movement of the conveyor belt;
   a pair of abutment elements arranged to keep the metallic disk fixed relative to the direction of movement of the conveyor belt; and
   a pair of load cells, operatively associated with the abutment elements and the disk, arranged to measure a thrust force exerted by the metallic disk on each load cell due to the relative sliding of the conveyor belt with respect to the metallic disk; and
   a mechanism having a piston to which the metallic disk is operatively connected, adapted to position the metallic disk on the conveyor belt when commanded to do so.

2. The measurement system of claim 1, wherein each load cell of said pair of load cells is arranged substantially at a 45 degree angle with respect to the direction of movement of the conveyor belt.

3. The measurement system of claim 1, further comprising an electronic processing unit arranged to receive, process, and store a signal generated by each load cell to determine a coefficient of friction of said metallic disk on the conveyor belt.

4. The measurement system of claim 1, wherein said at least one rounded element is an annular rounded element arranged concentrically with respect the metallic disk.

5. The measurement system of claim 1, wherein an odd number of pairs of rounded elements, distributed along the periphery of the bottom surface of the metallic disk, protrude from a bottom surface of the metallic disk, and wherein each rounded element extends in a non-radial direction.

6. The measurement system of claim 5, wherein each rounded element of each pair of rounded elements extends in a direction that converges in a radially outer direction.

7. The measurement system of claim 5, wherein the rounded elements are distanced from each other by at least 2 mm.

8. The measurement system of claim 1, wherein a plurality of lobe-shaped rounded elements protrudes from the bottom surface of the metallic disk.

9. The measurement system of claim 1, wherein the metallic disk is made of stainless steel.

10. The measurement system of claim 1, wherein the metallic disk is made of tempered, stainless steel.

11. The measurement system of claim 1, wherein the metallic disk is made of chromed, tempered, stainless steel, and has a surface hardness greater than or equal to 45 in the Rockwell— HRC hardness scale.

12. The measurement system of claim 1, wherein the metallic disk has a plurality of connections seats for connection, through threaded fasteners, with a body having a predetermined mass.

13. The measurement system of claim 1, wherein the metallic disk is arranged for mechanical coupling with a body of predetermined mass through a bayonet coupling or a snap-fit coupling.

14. A measurement method for measuring a coefficient of friction on a conveyor belt slidable in a direction of movement, the method comprising the steps of:
   placing a metallic disk floating on said conveyor belt, said metallic disk having a bottom surface, at least one rounded element having a contact surface that rests on said conveyor belt, protruding below the bottom surface, the shape of said at least one rounded element being such that, regardless of the relative orientation of the metallic disk with respect to the conveyor belt, at least one rounded element extends along a direction of extension that is not parallel to the direction of movement of the conveyor belt and keeping the metallic disk in a fixed position, with respect to the direction of movement of the conveyor belt; and
   generating, through a pair of load cells operatively associated with respective abutment elements and with said metallic disk, a measurement signal representative of a thrust force exerted by the metallic disk on each load cell, due to the relative sliding of the conveyor belt with respect to the metallic disk.

15. The measurement method of claim 14, further comprising the steps of:
   transmitting the measurement signal to an electronic processing unit; and
   processing the measurement signal through the electronic processing unit to determine a coefficient of friction of said metallic disk on the conveyor belt.

* * * * *